Figure 5:
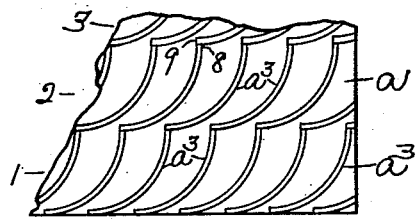

(No Model.)  A. F. JONES.  2 Sheets—Sheet 1.
PUTTING OUT ROLL.

No. 569,136.  Patented Oct. 6, 1896.

WITNESSES.
Matthew M Blunt.
J. Murphy.

INVENTOR.
Albert F Jones
By Jas. F. Churchill
ATT'Y (No Model.) 2 Sheets—Sheet 2.

A. F. JONES.
PUTTING OUT ROLL.

No. 569,136. Patented Oct. 6, 1896.

WITNESSES.
Frank E. Wilder
J. Murphy

INVENTOR.
Albert F. Jones
by Jas. H. Churchill
ATT'Y.

UNITED STATES PATENT OFFICE.

ALBERT F. JONES, OF SALEM, MASSACHUSETTS, ASSIGNOR TO THE VAUGHN MACHINE COMPANY, OF PORTLAND, MAINE.

PUTTING-OUT ROLL.

SPECIFICATION forming part of Letters Patent No. 569,136, dated October 6, 1896.

Application filed January 14, 1896. Serial No. 575,484. (No model.)

*To all whom it may concern:*

Be it known that I, ALBERT F. JONES, residing in Salem, in the county of Essex and State of Massachusetts, have invented an Improvement in Putting-Out Rolls, of which the following description, in connection with the accompanying drawings, is a specification, like letters on the drawings representing like parts.

This invention relates to a novel construction of roll for operating upon hides and skins, and more particularly to a roll for putting out or stretching the said hide or skin.

My present invention has for its object to provide a simple and efficient roll for the purpose specified.

In accordance with this invention the roll is provided with vanes or blades made in circular sections, which are arranged on the circumference of the roll in longitudinal or axial rows, the circular sectional blades or vanes of each row being secured to the roll so as to curve in opposite directions from a transverse line preferably at substantially the longitudinal center of the roll. The circular sectional vanes of each longitudinal row are arcs of circles of the same or substantially the same radius, and preferably the sectional circular vanes or blades of all the longitudinal rows are arcs of circles of the same or substantially the same radius. For the best results the circular sectional blades or vanes of the same longitudinal row, preferably on both sides of the transverse line, are applied to or formed on the roll so that the circular blades or vanes on each side of the transverse line are spaced or separated from adjacent blades or vanes by a uniform distance, so that any particular point or part of one blade will be separated from the same point or part of adjacent blades by the same distance. The circular blades or vanes of the same horizontal row are further applied to the roll so that the uniform spaces between the bottom or lower ends of the said blades will, for the best results, be of less distance than the spaces between the tops or upper ends of the said blades or vanes. Furthermore, the circular blades or vanes of adjacent longitudinal rows are preferably applied to or formed on the roll so that the lower ends of the blades of one row extend by or break joints with the upper ends of corresponding blades of the next lower row, for a purpose as will be described. These and other features of this invention will be pointed out in the claims at the end of this specification.

Figures 1, 2:
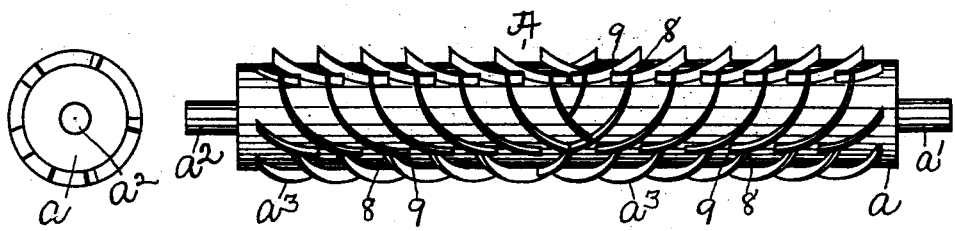
Figure 3:
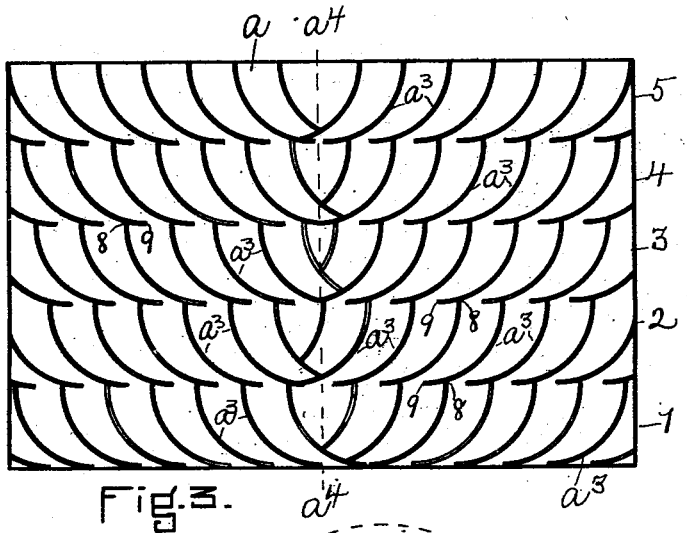
Figure 4:
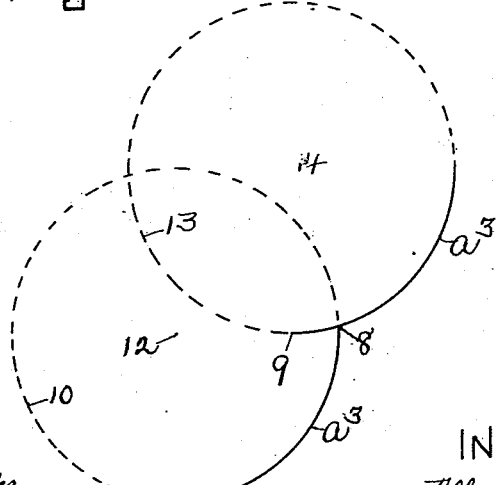

Figure 1 is an elevation of a putting-out roll embodying this invention; Fig. 2, an end elevation of the roll shown in Fig. 1; Fig. 3, a developed view of the body of the roll shown in Fig. 1; Fig. 4, a diagrammatic view to more clearly illustrate the operation of the roll, and Figs. 5, 6, and 7 details of modified forms of roll to be referred to.

Referring to Fig. 1, A represents a putting-out roll embodying this invention, the said roll being composed of a cylindrical body portion $a$, from which extend the journals $a'$ $a^2$. The body portion $a$ (shown developed in Fig. 3) is provided with a number of longitudinal rows of circular sections, blades, or vanes $a^3$, there being five such rows, (herein shown and numbered 1 2 3 4 5,) but any other number of longitudinal rows may be used, depending upon the diameter of the roll and the length of the blade. The circular blades $a^3$ of each longitudinal row are preferably all of the same length and are composed of arcs of circles of the same or substantially the same radius, and the circular blades of each longitudinal row are arranged on the body $a$ of the roll so that the blades on one side of a transverse line through the roll curve in one direction and the blades on the other side of the said line curve in the opposite direction. In the present instance the transverse line (represented by the dotted line $a^4$, Fig. 3) is located substantially at the longitudinal center of the roll.

The blades $a^3$ on each side of the transverse line $a^4$, preferably in each longitudinal row, are applied to or formed on the row so that the said blades are uniformly spaced with relation to any particular point or part in each blade, that is to say, a line drawn parallel to the axis of the roll through the blades on oppposite sides of the transverse line $a^4$ will intersect the said blades at uniform distances apart, but for the best results adjacent circular blades in the same longitudinal row are not parallel throughout their length, but are applied to or formed on the roll so that the upper ends 8 of the said blades are separated by uniform distances and the lower ends 9 are also separated by uniform distances, which upper and lower distances are unequal, the distance between the upper ends 8 of adjacent blades being greater than the distance between the lower ends 9 of adjacent blades.

In putting out or stretching a hide or skin it is especially desirable that the skin should be carried forward from the center of the roll toward its ends without leaving any plaits or wrinkles in the skin, and to effect the desired result with a roll having circular blades or vanes it is desirable that the blades of adjacent rows be applied to or formed on the roll so that the lower end of an upper blade shall act on the skin in a different direction from the main or upper portion of the adjacent blade in the next lower row, and the best results are and may be obtained by applying the circular blades so that their lower ends break joints with and extend by or beyond the upper ends of the blades on the next lower or adjacent row.

In Fig. 4 I have illustrated the relation of the blades in adjacent rows just referred to, and by reference to said figure it will be seen that the lower end 9 of the upper blade $a^3$ extends by the upper end 8 of the lower blade. These two blades for purpose of illustration may be supposed to be located in rows 1 and 2 of the roll, although the same relation holds good for any other two adjacent rows.

By reference to Fig. 4 it will be seen that the circular blade of the lower row 1 forms part of a circle 10, having the center 12, and that the circular blade of the upper row 2 forms part of a circle 13, having the center 14, and that these two circles are of the same radius with their centers out of line with each other. The operation of the circular blades or vanes of the roll A may be readily understood from the diagram shown in Fig. 4. In practice the hide or skin to be treated is laid upon a suitable support, such as shown in United States Patent No. 274,858, granted March 27, 1883, to J. W. Vaughn, and the roll A is revolved in such direction that the lower ends 9 of the circular blades will be first engaged with the hide or skin; and as the roll revolves it will be seen that the lower blade $a^3$ will force or carry the leather along with it and away from a vertical line through the center 12, and therefore away from a transverse line through the roll A, and consequently toward the end of the said roll. This movement of the leather toward the end of the roll tends to form a wrinkle in front of the blade, and if the movement of the leather was continued in the same direction by the next adjacent blade in the upper row a plait would be formed, but by reason of the curved lower portion of the upper blade acting on the wrinkled leather in the direction of the length of the wrinkle, but at an angle thereto, the said wrinkle is smoothed out and the skin further stretched in the direction toward the end of the roll.

The formation of wrinkles in the leather in the manner described is best avoided and a superior stretch of the leather obtained by making the lower end 9 of the upper blade $a^3$ extend by the upper end of the lower blade, so that the lower portion of the upper blade $a^3$, extended by or beyond the upper end of the lower blade, may act upon the leather after the upper portion of the lower blade and in a different direction, which is crosswise of the wrinkle, thereby smoothing out any wrinkles which may have been formed or started by the upper portion of the lower blade, as above set forth. This smoothing-out portion of the upper blade may and preferably will be substantially straight, its curve being so gradual, as shown in Fig. 4, wherein the portion referred to is included between the numerals 8 9. The extent to which the lower end of the upper blade may extend by or beyond the upper end of the lower blade may vary to suit different workings of the hide or skin, and good results have been obtained with the lower end of the upper blade separated a slight distance from the upper end of the lower blade, and, therefore, I do not desire to limit my invention to the particular construction or arrangement of the circular blades shown in Figs. 1 and 2, as an efficient roll may be obtained with the circular blades arranged as shown in Figs. 5 to 7.

In Fig. 5 I have shown the lower end of the circular blades of an upper row in contact with the upper end of the circular blades in the lower row and ending substantially flush with the inner surface of the blades in the lower row.

Figure 6:
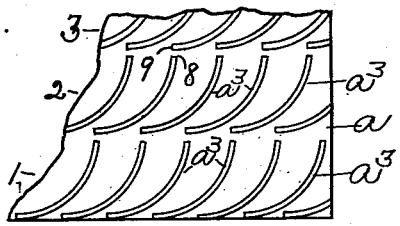

In Fig. 6 the arrangement of the circular blades is substantially the same as in Fig. 5, except that the upper ends of the circular blades in the lower row are separated from the lower ends of the blades in the upper row.

Figure 7:
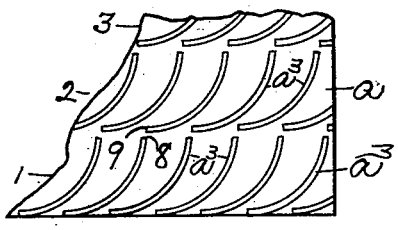

In Fig. 7 the blades in the upper and lower rows are separated substantially as shown in Fig. 6, but the lower ends of the blades in the upper row are substantially flush or in line with the outer surface of the blades in the lower row.

By reference to Figs. 1, 3, 5, 6, and 7 it will be seen that all the circular vanes or blades on one side of the transverse line curve in the same general direction toward one end of the roll, and that all the circular blades on the other side of the transverse line curve in the opposite direction toward the opposite end of the roll with the same general curvature, and that each blade on one side of the transverse line forms a section or part of a substantially continuous scalloped blade extended from the transverse line toward one end of the roll and composed of circular sections of the same or substantially the same radius, and this scalloped construction is more emphatically shown in Fig. 5.

I claim—

1. A roll for working leather provided with circular blades or vanes arranged in longitudinal or axial rows, each row of circular blades having a plurality of blades on one side of a transverse line through the roll curved in one direction and a plurality of blades on the other side of the said transverse line curved in an opposite direction, substantially as described.

2. A roll for working leather provided with circular blades arranged on the roll with the upper end of one circular blade contiguous to the lower end of another circular blade whereby a plurality of the contiguous circular blades encircle the roll in the form of a substantially continuous scalloped blade extended from a transverse line through the roll toward its end, substantially as described.

3. A roll for working leather provided with circular blades or vanes arranged in longitudinal or axial rows with a plurality of blades or vanes in each row of substantially the same radius, substantially as described.

4. A roll for working leather provided with a plurality of longitudinal or axial rows of circular blades or vanes, the vanes comprising each of said rows being made in arcs of circles of substantially the same radius, and the vanes of adjacent rows being formed on the cylinder with the lower ends of an upper circular blade extended by the upper end of a lower circular blade, substantially as described.

5. A roll for working leather provided with circular blades or vanes arranged in longitudinal or axial rows, each row being composed of two sets disposed on opposite sides of a transverse line through the roll and extending at an angle opposite to that of the other set in the same row, the circular blades of one row being arranged on the cylinder with relation to the circular blades of the next adjacent row, so that the lower portion of a circular blade in an upper row may act on the hide or skin in a different direction from the upper portion of a circular blade in the next adjacent row, substantially as described.

6. A roll for working leather consisting of a cylindrical body provided with a plurality of circular blades arranged in longitudinal or axial rows, with the circular blades of each row curving in opposite directions from a line transversely through the roll, the lower portion of the circular blades on one side of the said transverse line being nearer together than the upper portions of the same circular blades, substantially as described.

In testimony whereof I have signed my name to this specification in the presence of two subscribing witnesses.

ALBERT F. JONES.

Witnesses:
JAS. H. CHURCHILL,
J. MURPHY.